United States Patent

Caputo et al.

[11] 4,161,235
[45] Jul. 17, 1979

[54] ELEVATOR SYSTEM

[75] Inventors: William R. Caputo, Wyckoff; Alan L. Husson, Hackettstown, both of N.J.

[73] Assignee: Westinghouse Electric Corp., Pittsburgh, Pa.

[21] Appl. No.: 907,523

[22] Filed: May 19, 1978

[51] Int. Cl.² .............................................. B66B 1/30
[52] U.S. Cl. ................................................ 187/29 R
[58] Field of Search ......................................... 187/29

[56] References Cited
U.S. PATENT DOCUMENTS

| 4,030,570 | 6/1977 | Caputo ................................... | 187/29 |
| 4,094,386 | 6/1978 | Suzuki et al. .......................... | 187/29 |
| 4,095,678 | 6/1978 | Kito ....................................... | 187/29 |
| 4,124,101 | 11/1978 | Satoh ..................................... | 187/29 |

Primary Examiner—J. V. Truhe
Assistant Examiner—W. E. Duncanson, Jr.
Attorney, Agent, or Firm—D. R. Lackey

[57] ABSTRACT

An elevator system in which the movement of the elevator car is responsive to a comparator which provides an error signal responsive to the difference between the magnitude of a speed pattern signal provided by a speed pattern generator, and a signal responsive to actual car speed. An adjustable impedance device controls the affect of the speed pattern signal on the comparator, with the impedance of the adjustable impedance device being responsive to at least one predetermined parameter of the speed pattern signal.

17 Claims, 3 Drawing Figures

ELEVATOR SYSTEM

BACKGROUND OF THE INVENTION

1. Field of the Invention

The invention relates in general to elevator systems, and more specifically to elevator systems of the type which are controlled by a speed pattern generator.

2. Description of the Prior Art

It is conventional in traction elevator systems of the type in which the elevator car is responsive to a drive machine which includes a D.C. motor, to control the speed of the D.C. motor, and thus the speed of the elevator car, in response to the error or deviation between a speed pattern signal provided by a speed pattern generator, and a signal responsive to the actual speed of the elevator car.

Predetermined failure modes of the speed pattern generator may result in the elevator car exceeding its rated maximum speed. At a first overspeed magnitude, the governor speed reducing switch operates to reduce the magnitude of the speed pattern signal. At a second overspeed magnitude, an emergency stop is made. If the elevator car reaches a third overspeed magnitude, the safety is set. Thus, it would be desirable to monitor predetermined parameters of the speed pattern signal, such as the magnitude of the speed pattern signal, and the rate of change of the speed pattern signal, before it is applied to the comparator which generates the error signal, and to modify the affect of the speed pattern signal on the comparator when either its magnitude, or its rate of change, or both, exceed predetermined values. Monitoring of the speed pattern signal, and limiting predetermined parameters thereof, however, must be accomplished by monitoring and limiting circuits which have no failure modes which could result in a car overspeed condition.

Further, it would be desirable for the elevator car to approach its rated maximum speed without overshoot, as the speed governor trip settings may be made closer to the maximum rated speed without nuisance trips, when overshooting is not present. Such overshoot of maximum rated speed may be prevented by adjusting the dynamics of the traction drive machine. However, this may be undesirable as it may result in sluggishness of the elevator car during landings. Thus, it would be desirable to be able to prevent overshoot of the maximum car speed, without changing the dynamics of the motor drive, or otherwise deleteriously affecting the performance of the elevator system.

SUMMARY OF THE INVENTION

Briefly, the present invention is a new and improved elevator system of the traction type which includes an elevator car, a drive machine for the elevator car, a speed pattern generator providing a speed pattern signal, a device for providing a velocity signal responsive to the actual speed of the elevator car, and error signal means providing an error signal for controlling the drive machine in response to the deviation of the velocity signal from the speed pattern signal. A controllable impedance device, such as a field effect transistor, is connected such that when it is conductive it pulls the speed pattern signal toward ground, regardless of the polarity of the speed pattern signal. No failure modes of the field effect transistor, when it is connected to pull the speed pattern signal towards ground, can result in increasing the speed of the elevator car. The impedance of the controllable impedance device is responsive to control circuitry which processes the speed pattern signal to obtain control signals responsive to the parameters to be monitored and limited. Comparators compare the control signals with appropriate reference signals, and they provide signals which modify the impedance of the controllable impedance device when the reference signals are exceeded.

In a preferred embodiment of the invention, a control signal responsive to the maximum desired value of the speed pattern signal includes a factor related to the rate of change of the speed pattern signal. By comparing this control signal with a reference related to maximum car speed, the car approaches the maximum car speed smoothly and exponentially, without overshoot.

Slope limiting means is applied to the speed pattern signal prior to the processing of the speed pattern signal by the monitoring and limiting means, permitting the use of absolute value circuitry in the monitoring and limiting functions.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
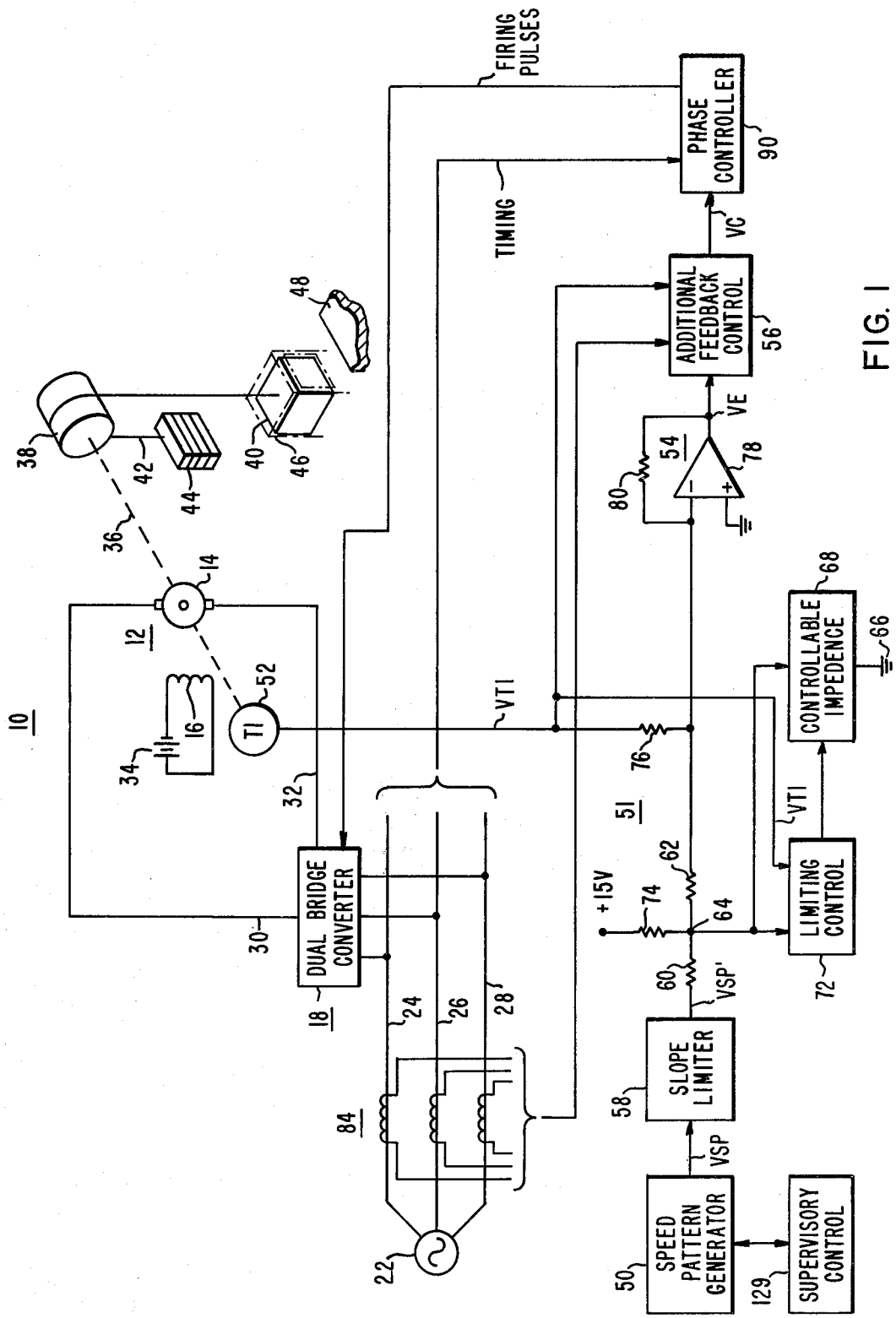
FIG. 1 is a partially schematic and partially block diagram of an elevator system constructed according to the teachings of the invention.

Referring now to the drawings, and FIG. 1 in particular, there is shown a partially schematic and partially diagrammatic view of an elevator system 10 constructed according to the teachings of the invention. Elevator system 10 includes a direct current drive motor 12 having an armature 14 and a field winding 16. The armature 14 is electrically connected to an adjustable source of direct current potential. The source of potential may be a direct current generator of a motor-generator set in which the field current of the generator is controlled to provide the desired magnitude and polarity of unidirectional potential; or, as shown in FIG. 1, the source of direct current potential may be a static source, such as a dual converter 18.

As is well known in the art, the dual converter 18 includes first and second converter banks which may be three-phase, full-wave bridge rectifiers connected in parallel opposition. Each converter includes a plurality of static controlled rectifier devices connected to interchange electrical power between alternating and direct current circuits. The alternating current circuit includes a source 22 of alternating potential and busses 24, 26 and 28; and, the direct current circuit includes busses 30 and 32, to which the armature 14 of the direct current motor 12 is connected. The dual bridge converter 18 not only enables the magnitude of the direct current voltage applied to the armature 14 to be adjusted, by controlling the conduction or firing angle of the controlled rectifier devices, but it allows the direction of the direct current flow through the armature to be reversed when desired, by selectively operating the converter banks. Dual converter apparatus which may be used is shown in detail in U.S. Pat. Nos. 3,713,011 and 3,713,012, which are assigned to the same assignee as the present application.

The field winding 16 of drive motor 14 is connected to a source 34 of direct current voltage, represented by a battery in FIG. 1, but any suitable source, such as a single bridge converter, may be used.

The drive motor 12 includes a drive shaft indicated generally by broken line 36, to which a traction sheave 38 is secured. An elevator car 40 is supported by wire ropes 42 which are reeved over the traction sheave 38, with the other ends of the ropes being connected to a counterweight 44. The elevator car is disposed in a hoistway 46 of a structure having a plurality of floors or landings, such as floor 48, which are served by the elevator car. A tachometer 52 provides a signal VT1 responsive to the actual speed of the elevator car.

The movement mode of the elevator car 40 and its position in the hoistway 46 are controlled by the voltage magnitude applied to the armature 14 of the drive motor 12. The magnitude of the direct current voltage applied to armature 14 is responsive to a speed pattern signal or velocity command signal VSP provided by a suitable speed pattern generator 50. For example, the speed pattern generator may be constructed as disclosed in U.S. Pat. No. 3,774,729, which is assigned to the same assignee as the present application. A servo control loop 51 controls the speed of the drive motor, and thus the position of the elevator car 40 in response to the velocity command signal VSP. Any suitable servo control loop may be used, such as the control loop disclosed in the hereinbefore mentioned U.S. Patents, as well as improvements thereon, such as disclosed in U.S. Pat. No. 4,030,570, which is assigned to the same assignee as the present application.

For purposes of describing the present invention, the control loop 51 is illustrated as being responsive to supervisory control 129, which receives calls for elevator service and signals responsive to the location and travel direction of the elevator car 40. In response to these calls and signals, the supervisory control provides signals for controlling the speed pattern generator 50 to initiate the acceleration and deceleration portions of the speed pattern signal VSP as required to serve the calls for elevator service. Suitable supervisory control is disclosed in the hereinbefore mentioned U.S. Pat. No. 3,774,729.

In a conventional or prior art control loop the output signal VSP of the speed pattern generator, representing the desired elevator car, and the velocity feedback signal VT1, which represents the actual speed of the elevator car, would be applied to a summing point to provide a difference signal which would be applied to an error amplifier 54. The amplified error signal VE would be additionally processed in feedback control, shown generally at 56, with such feedback, for example, including a current signal from current transformers 84, and a velocity signal VT1 which may be differentiated to obtain an acceleration signal for stabilization purposes. The feedback circuits are described in the hereinbefore mentioned U.S. patents. The additional feedback control 56 provides a control signal VC for a phase controller 90, which receives waveform information from A.C. conductors 24, 26 and 28, and it provides firing pulses for the controllable switching devices of the dual bridge converter 18. A suitable phase controller is illustrated in the hereinbefore mentioned U.S. Pat. Nos. 3,713,011 and 3,713,012.

The present invention relates to the monitoring and limiting of certain parameters of the speed pattern signal VSP. The speed pattern signal VSP is of one polarity when the elevator car is to go in the up direction, and of the opposite polarity when it is to go in the down direction. Thus, it would be convenient in the monitoring circuits to obtain a single polarity signal responsive to the absolute value of the speed pattern signal, and to process this single polarity signal, regardless of the instant polarity of the speed pattern signal VSP. A malfunction in the speed pattern generator which would instantaneously switch the pattern from maximum rated speed in one direction, to maximum rated speed in the other direction, would not be detected when using absolute value processing circuitry. Thus, the elevator car could be subjected to an excessive rate of deceleration, and acceleration, even with acceleration limiting features in the monitoring and limiting circuitry. This can be prevented by processing the positive speed pattern signal with one set of monitoring and limiting circuitry, and the negative speed pattern signal with another set of monitoring and limiting circuitry. However, in a preferred embodiment of the invention, the necessity of two complete sets of monitoring and limiting circuitry is eliminated, and absolute value processing of the speed pattern signal is made practical, by applying the speed pattern signal VSP to a slope limiting function 58. The slope limiting function 58 prevents any quick change in the speed pattern signal, limiting the maximum rate of change thereof to a corresponding maximum acceleration and deceleration, which may be 7 feet/second$^2$, for example. The slope limiting function enables the monitoring and limiting functions, which are located further downstream in the control loop, to handle pattern reversal, or failure of the speed pattern generator, i.e., pattern drop-out. The slope limiting function 58 limits the rate of change of the speed pattern signal to a value which can be adequately monitored by the monitoring and limiting functions of the invention. The slope limited speed pattern signal is referenced VSP', in order to indicate that it has been processed by the slope limiting function.

It is of the utmost importance that the monitoring and limiting functions be fail-safe, from the standpoint of not adding any failure modes which could result in increasing the magnitude of the speed pattern signal, and thus increasing the speed of the elevator car. The present invention is fail-safe in that the sole affect on the speed pattern signal VSP' which can possibly be provided by the monitoring and limiting circuits is to pull the speed pattern signal VSP towards ground, thus reducing, instead of increasing, the speed requested by the speed pattern generator.

More specifically, the usual summing resistor for the speed pattern signal VSP is divided into two serially connected resistors 60 and 62, each equal to one-half of the value of the usual summing resistor. For example, each may be 10K ohms. The junction 64 between resistors 60 and 62 is connected to ground 66 via a controllable impedance device 68. In a preferred embodiment, the controllable impedance device is a field effect transistor, because of its high input impedance, and because it is voltage controlled, requiring an almost insignificant gate current. A specific embodiment of the invention using a field effect transistor will be described in detail with reference to FIG. 2.

The controllable impedance device 68 is controlled by a monitoring and limiting function 72, which monitors the speed pattern signal VSP' at junction 64. Junction 64 is also connected to a positive source of potential, such as +15 volts, via a resistor 74. Resistor 74 has a large value, such as 4.7 megohms, which is selected to cancel the small amount of biasing current drawn by the monitoring and limiting functions. The biasing current, while small, could result in a positional error at low car speeds, without the offsetting compensation provided by resistor 74 and the positive source of potential.

While the monitoring and limiting of the speed pattern signal VSP' may be solely responsive to parameters of the speed pattern signal itself, the monitoring and limiting of the speed pattern signal may also be responsive to one or more predetermined parameters of the actual speed of the elevator car, as represented by velocity signal VT1. Thus, signal VT1 is illustrated in FIG. 1 as also being connected to the monitoring and limiting function 72.

The velocity signal VT1 is applied to an input of error amplifier 54 via a resistor 76. Error amplifier 54 may be an operational amplifier (op amp) 78 having a feedback resistor 80. Resistors 62 and 76 are connected to the inverting input of op amp 78, and the non-inverting input is connected to ground. The remaining portions of the control loop 51 may be as described in the hereinbefore mentioned U.S. patents.

In the operation of the elevator system 10 the controllable impedance device 68 is biased to its non-conductive state. The monitoring and limiting function 72 is designed with a high input impedance and thus does not load the control loop. Thus, when the speed pattern signal VSP' and the velocity signal VT1 are not exceeding any of the preset limits for the monitored parameters, the monitoring and limiting function 72 has no affect on the speed pattern signal. In a preferred embodiment of the invention, a factor related to the rate of change of the speed pattern, and also of the actual car speed, if desired, is introduced into a limiting function related to the maxium rated car speed. This interrelationship between speed, and the rate of change of speed, results in the elevator car entering the maximum speed phase of its run smoothly and exponentially, without overshoot. Thus, in this embodiment, the monitoring and limiting function modifies the affect of the speed pattern signal on the error amplifier 54 on every run of the elevator car during which the maximum rated speed of the elevator car is attained.

The monitoring and limiting function 72 modifies the affect of the speed pattern signal on the error amplifier by reducing the impedance of the controllable impedance device 68 by a controlled magnitude, which results in pulling the speed pattern signal closer to ground, regardless of the polarity of the speed pattern signal. The impedance of the controllable impedance device 68 is reduced to the point necessary to bring the speed pattern signal within the preset limits established for the speed pattern signal, and also for the velocity signal VT1, if the velocity signal VT1 is also monitored.

Figure 2:
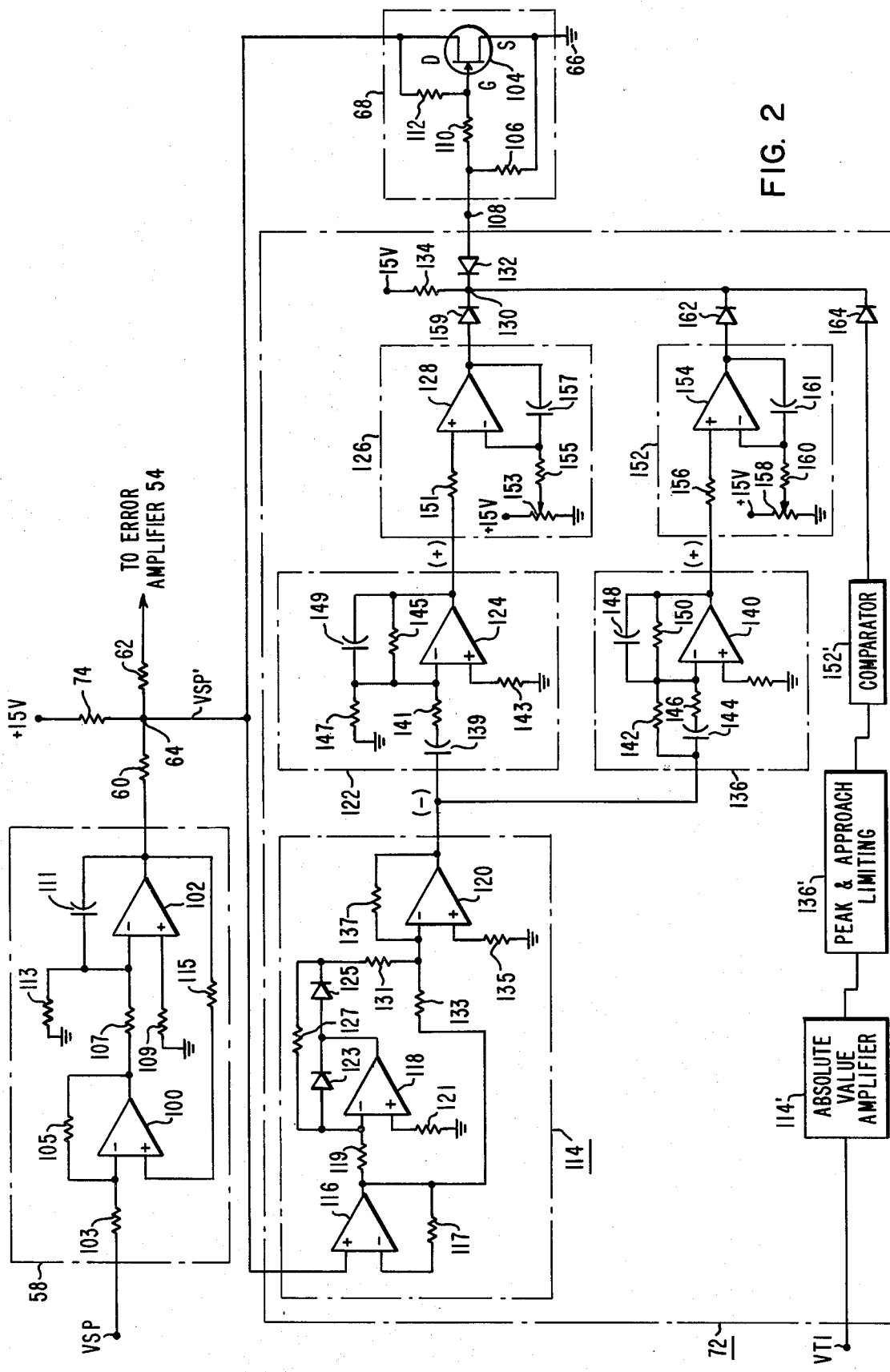
FIG. 2 is a schematic diagram illustrating an exemplary implementation of certain of the functions shown in block form in FIG. 1.

FIG. 2 is a schematic diagram of circuitry which may be used to perform certain of the functions shown in block form in FIG. 1. The slope limiting function 58 may be provided by first and second op amps 100 and 102, respectively, with the first op amp 100 being connected as a high gain linear amplifier, and the second connected as an integrator. The signal VSP is applied to the inverting input of op amp 100 via a resistor 103, with negative feedback being provided via a resistor 105. The output of op amp 100 is applied to the inverting input of op amp 102 via a resistor 107, and the non-inverting input of op amp 102 is tied to ground via a resistor 109. An RC circuit including capacitor 111 and resistor 113 is connected from the output of op amp 102 to ground, with a junction between capacitor 111 and resistor 113 being connected to the inverting input of op amp 102. The output of op amp 102 is also connected to the non-inverting input of op amp 100 via a resistor 115. The double inversion provided by this circuit, with the output of op amp 102 being fed back to the non-inverting input of op amp 100, results in the output of op amp 102 following the polarity of the input. The output faithfully follows the input, except for a rapid change in the input voltage. The response time for a rapid or step change is selected such that the maximum rate of change of the output for a step input is equivalent to the maximum desired acceleration, or deceleration rate, such as 7 feet/second$^2$, for example.

The speed pattern signal appearing at junction 64 is applied to the controllable impedance device 68, which includes an N-channel, junction field effect transistor (JFET) 104. JFET 104 is connected to function as a voltage variable resistor in which the drain-to-source resistance of the device is controlled by the bias voltage between the gate and source. A bias resistor 106 is connected from an input terminal 108 to the source S, and the source S is connected to ground 66. Input terminal 108 is connected to gate G via a resistor 110, and a resistor 112 is connected from the drain D to the gate G. Junction 64 is connected to the drain D. Resistors 110 and 112 are selected to have very large values, such as 1.5 megohms and 3 megohms, respectively. Thus, any short circuit failure modes of FET 104 will not cause the control voltage at input terminal 108 to have any appreciable affect on the voltage at junction 64.

The control voltage at input terminal 108 is provided by the monitoring and limiting function 72. The monitoring and limiting function 72 is responsive tothe pattern voltage at junction 64, and, if desired, it may also be responsive to the velocity signal VT1. The monitoring and limiting function will only be described in detail relative to the processing of the speed pattern signal VSP', as similar circuitry may be used to process the velocity signal VT1.

More specifically, the speed pattern signal VSP' is first applied to an input buffer and absolute value function 114. This function includes first, second, and third op amps 116, 118 and 120, respectively. Op amp 116 is connected as a non-inverting amplifier to function as a high input impedance follower, op amp 118 is connected as a precision rectifier, and op amp 120 is connected as a summing amplifier. Op amps 118 and 120 provide a precision full-wave rectification of the input signal, with the output of op amp 120 being negative, regardless of the polarity of the input signal.

More specifically, the speed pattern signal VSP' is applied to the non-inverting input of op amp 116, and the output of op amp 116 is fed back to its inverting input via a resistor 117. The output of op amp 116 is applied to the inverting input of op amp 118 via a resistor 119, and the non-inverting input of op amp 118 is connected to ground via a resistor 121. The inverting input of op amp 118 is connected to the inverting input of op amp 120 via serially connected diodes 123 and 125 and a resistor 131. The output of op amp 118 is connected to the junction between diodes 123 and 125, and a resistor 127 is connected across the serially connected diodes 123 and 125. The output of op amp 116 is also connected to the inverting input of op amp 120 via a resistor 133. The non-inverting input of op amp 120 is connected to ground via a resistor 135. Negative feedback for op amp 120 is provided via a resistor 137.

The first parameter of the speed pattern signal which is monitored is the rate of change of the pattern signal, i.e., acceleration. An acceleration monitoring function 122 includes an op amp 124 connected as a differentiator. The output of op amp 120 is applied to the inverting input of op amp 124 via serially connected capacitor 139 and resistor 141. The non-inverting input of op amp 124 is tied to ground via a resistor 143. Resistors 145 and 147 are connected from the output of op amp 124 to ground, and the junction between these resistors is connected to the inverting input of op amp 124. Since noise is introduced with any differentiating step, a filter capacitor 149 may be connected across the negative feedback resistor 145, as shown.

The output of op amp 124 is a positive signal having a magnitude responsive to the rate of change of the speed pattern signal VSP'. This output signal is applied to a comparator 126, which may include an op amp 128. The output of op amp 124 is applied to the non-inverting input of op amp 128 via a resistor 151, and a positive reference voltage is applied to the inverting input of op amp 128 via an adjustable resistor 153 and a fixed resistor 155. The adjustable resistor 153 is connected from a positive source of potential, such as +15 volts, to ground, and the inverting input of op amp 128 is connected to the adjustable arm of resistor 153 via the fixed resistor 155. The positive reference voltage is selected such that the acceleration limit has the desired value, such as about 1.1 times the normal acceleration rate. A capacitor 157 may be connected from the output of op amp 128 to the inverting input thereof, in order to remove a sawtooth ripple from the output of op amp 128.

As long as the input voltage to the non-inverting input of op amp 128 is less than the reference voltage, the output of op amp 128 will be negative. When the output from the acceleration circuit 122 exceeds the reference, the output of op amp 128 will switch to a positive polarity.

A biasing and clamp circuit for JFET 104 includes a junction 130 to which input terminal 108 of a controllable impedance device 68 is connected via a diode 132. Diode 132 is poled to prevent the gate-source of JFET 104 from being forward biased. Forward biasing is to be avoided, as it would destroy the high input impedance of the JFET, and cause gate current to flow which would load down the speed pattern circuit.

Negative bias for JFET 104 is provided by a source of negative potential, such as −15 volts which source is connected to junction 130 via a resistor 134. The negative bias is selected to pinch-off drain-source current flow through JFET 104. The output of op amp 128 is connected to junction 130 via a diode 159. Diode 159 is poled to conduct current toward junction 130.

When the output of comparator 126 switches positive, indicating acceleration limiting is necessary, junction 130 becomes less negative, and the drain-source resistance of JFET 104 is reduced accordingly, allowing current flow therethrough. If the pattern signal has a positive polarity at this time, current flows away from junction 64 to pull the pattern towards ground. If the pattern signal has a negative polarity at this time, current flows towards junction 64, which also pulls the speed pattern signal back towards ground.

Another parameter of the speed pattern signal VSP' which is monitored, is the maximum value of the pattern signal. This monitoring function is accomplished by the circuit 136. Circuit 136 includes an op amp 140. The value of the speed pattern signal at any instant is applied to the inverting input of op amp 140 via a resistor 142. If it is only desirable to monitor maximum speed, this input would be sufficient. In a preferred embodiment of the invention, it is also desirable to anticipate the arrival of the speed pattern at the maximum speed point, and to take any corrective action which is necessary to enable the elevator car to smoothly and exponentially blend into the maximum speed, without overshoot. This is accomplished by adding to the inverting input of op amp 140 a signal related to the rate of change of a speed pattern signal, with a capacitor 144 and a resistor 146 being connected from the output of op amp 120 to the inverting input of op amp 140. Thus, when the speed pattern signal is in its acceleration phase, a signal responsive to the value of the speed pattern signal, plus a factor related to acceleration, provides a signal at the inverting input of op amp 140 which will be more negative than it would otherwise be when using merely the value of the speed pattern signal. This in turn provides a signal at the output of op amp 140 which is more positive than it would otherwise be, in order to indicate to the following comparator circuit that the speed pattern has reached its maximum value, when it actually has not attained that value. As illustrated, a filter capacitor 148 may be connected across the negative feedback resistor 150, for reducing electrical noise.

The output of op amp 140 is applied to a comparator 152 which is similar in construction to comparator 126. Comparator 152 includes an op amp 154 which receives the output of op amp 140 at its non-inverting input via a resistor 156. An adjustable resistor 158, a fixed resistor 160, and a +15 volt source of potential provide a reference voltage for the inverting input of op amp 153 which is selected to provide the desired peak pattern limit, such as 1.01 times full speed. When the output of op amp 140 exceeds the reference, indicating speed limiting is necessary, op amp 154 switches to a positive polarity and a diode 162 applies a positive voltage to junction 130. This positive voltage makes junction 130 less negative, and the resistance of JFET 104 is reduced to allow the necessary current to flow for limiting the pattern signal. The affect on the speed pattern signal is such that the responding elevator car approaches the maximum speed limit smoothly, without overshoot thereof.

As further illustrated in FIG. 2, the teachings of the invention may be applied to monitoring the actual car speed, and in response thereto to introduce limiting into the speed pattern signal. The actual speed of the elevator car in the exemplary embodiment is represented by signal VI1. Signal VT1 has a polarity responsive to car travel direction, and it is applied to a buffer and absolute value function 114', which may be similar to that described relative to function 114. The output of function 114' is applied to a peak and approach limiting function 136', which may be similar to function 136, and the output of this function is applied to a comparator 152', which may be similar to comparator 152. The output of comparator 152' is applied to junction 130 via a diode 164, with this circuit having the same affect on JFET 104 as hereinbefore described relative to the acceleration and maximum speed channels which monitored the speed pattern signal VSP'.

In general, it is felt that monitoring the hereinbefore mentioned parameters of the speed pattern signal provides completely adequate monitoring and limiting of the speed pattern signal. If additional monitoring is desirable relative to the actual car speed, it is felt that it is only necessary to monitor the maximum value thereof. If the actual car speed VT1 were to be processed in order to provide acceleration limiting, the acceleration signal would be difficult to stabilize. Further, since stabilization thereof would be tied to system dynamics, it may present a possible failure mode if this monitoring channel were to go into oscillation.

Figure 3:
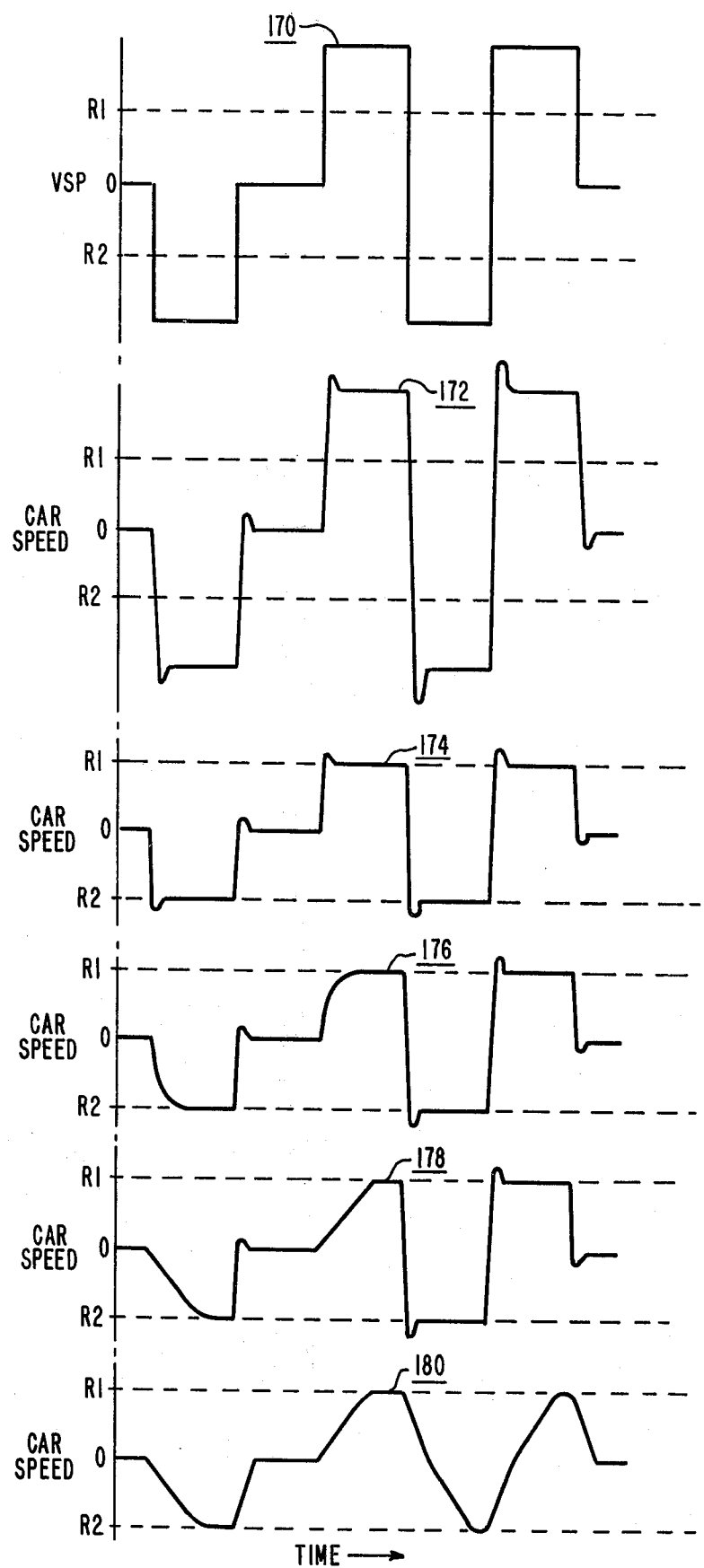
FIG. 3 is a graph which illustrates car response to a stepped speed pattern signal, as various features of the invention are added to the monitoring and limiting circuitry.

FIG. 3 is a graph which illustrates the functioning of the various monitoring and limiting features of the invention, added one feature at a time. Curve 170 illustrates an extreme malfunctioning speed pattern signal VSP which varies from zero in steps, instead of smoothly with the desired rate of change as it would in a normal speed pattern. Further, the maximum value of the speed pattern VSP in curve 170 is twice rated maximum speed, with rated maximum speed being indicated for one travel direction by dotted line R1, and for the other travel direction by dotted line R2.

Curve 172 simulates the response of the elevator car to the speed pattern signal 170, without any monitoring and limiting, as taught by the invention. The car speed overshoots the maximum speed dictated by the pattern, with the overshoot being even greater in response to pattern reversal.

Curve 174 simulates the response of the elevator car to the speed pattern signal 170, with only the peak limiting feature being applied. In other words, only the function 136 of FIG. 2 is effective, and capacitor 144 and resistor 146 would be eliminated. It will be noted that while the car speed is now limited to the full rated speed, that the car speed overshoots the maximum rated speed as it adjusts to this limitation.

Curve 176 simulates the response of the elevator car to the speed pattern signal 170 with peak limiting and exponential approach to full speed. In other words, only function 136 of FIG. 2 is effective, and capacitor 144 and resistor 146 would also be connected into the circuit as illustrated. It will be noted that the car speed approaches full speed smoothly and without overshoot in response to a step increase in the pattern from zero to full-speed, but some overshoot occurs in response to a step reversal of the pattern.

Curve 178 simulates the response of the elevator car to the speed pattern signal with peak limiting, exponential approach to full speed, and acceleration limiting applied. In other words, functions 122 and 136 of FIG. 2 are both active. It will be noted that the acceleration is limited, but no limiting is applied to pattern failures, i.e., a step from full speed to zero, or to pattern reversal, i.e., a step from maximum speed in one direction to maximum speed in the other direction.

Curve 180 simulates the response of the elevator car to the speed pattern signal 170 with peak limiting, exponential approach to maximum speed, acceleration limiting, and slope limiting. In other words, functions 122, 136 and 58 of FIG. 2 are all active. It will be noted that pattern failure and pattern reversal, as well as step increases, are all handled without exceeding maximum speed, without any overshoot of maximum speed, and without exceeding desired acceleration or deceleration rates.

We claim as our invention:

1. An elevator system, comprising:
   an elevator car,
   motive means for said elevator car,
   speed pattern means providing a speed pattern signal indicative of the desired speed of said elevator car,
   means providing a velocity signal responsive to the actual speed of said elevator car,
   controllable impedance means,
   control means providing a first control signal responsive to at least one predetermined parameter of said speed pattern signal, said control means including reference means providing a first reference signal relative to said at least one predetermined parameter, said control means modifying the impedance of said controllable impedance means in response to a predetermined relationship between said first control signal and said first reference signal,
   and error signal means providing an error signal for controlling said motive means in response to said velocity signal and said speed pattern signal,
   said controllable impedance means being connected to modify the affect of said speed pattern signal on said error signal means, at least when its impedance is modified by said control means.

2. The elevator system of claim 1 wherein the control means additionally provides a second control signal responsive to at least one predetermined parameter of the velocity signal, with the reference means providing a second reference signal relative to said at least one predetermined parameter of the velocity signal, and wherein the control means modifies the impedance of the controllable impedance means in response to a predetermined relationship between said second control signal and said second reference means.

3. The elevator system of claim 1 wherein the speed pattern signal provided by the speed pattern means has different polarities for the up and down travel directions, and wherein the first control signal is a single polarity signal.

4. The elevator system of claim 1 wherein the controllable impedance means is connected to have the affect on the error signal means of pulling the magnitude of the speed pattern signal towards ground, regardless of the polarity of the speed pattern signal.

5. The elevator system of claim 1 wherein the at least one predetermined parameter of the speed pattern signal is the magnitude of the speed pattern signal, the first reference signal is the desired maximum value of the speed pattern signal, and the predetermined relationship which causes the control means to modify the impedance of the controllable impedance means is the magnitude of the first control signal exceeding the magnitude of the first reference signal.

6. The elevator system of claim 5 wherein the control means reduces the impedance of the controllable impedance means when the magnitude of the first control signal exceeds the magnitude of the first reference signal, until the magnitude of the speed pattern signal drops below the magnitude of the first reference signal.

7. The elevator system of claim 1 wherein the first control signal is responsive to at least one predetermined parameter of the speed pattern signal, and to an additional parameter, with the at least one parameter being the magnitude of the speed pattern signal, and with the additional parameter being a factor related to the rate of change of the speed pattern signal, and wherein the predetermined reference signal is the desired maximum value of the speed pattern signal, and wherein the predetermined relationship therebetween which causes the control means to modify the impedance of the controllable impedance means is the magnitude of the first control signal exceeding the magnitude of the first reference signal, whereby the elevator car attains the maximum desired speed without overshoot.

8. The elevator system of claim 1 wherein the at least one predetermined parameter of the speed pattern signal is the rate of change of the speed pattern signal, the first reference signal is the desired maximum value of the rate of change of the speed pattern signal, and the predetermined relationship which causes the control means to modify the impedance of the controllable impedance means is the magnitude of the first control signal exceeding the magnitude of the first reference signal.

9. The elevator system of claim 8 wherein the control means reduces the impedance of the controllable impedance means, when the magnitude of the rate of change of the speed pattern signal exceeds the magnitude of the first reference signal, until the magnitude of the rate of change of the speed pattern signal drops below the magnitude of the first reference signal.

10. The elevator system of claim 1 wherein the at least one predetermined parameter of the speed pattern signal is the rate of change of the speed pattern signal, the first reference signal is the desired maximum value of the rate of change of the speed pattern signal, and wherein the control means additionally provides a second control signal responsive to the magnitude of the speed pattern signal, and the reference means provides a second reference signal representative of the desired maximum value of the speed pattern signal, with the control means modifying the impedance of the controllable impedance means in response to a predetermined relationship between the magnitude of the second control signal, and the magnitude of the second reference signal.

11. The elevator system of claim 10 wherein the second control signal, in addition to a factor representative of the desired maximum value of the speed pattern signal, includes a factor responsive to the rate of change of the speed pattern signal.

12. The elevator sytem of claim 1 wherein the controllable impedance means is a field effect transistor having main and gate electrodes, with its gate electrode being connected to the control means, and with its main electrodes providing a path to ground for the speed pattern generator signal at a point between the speed pattern means and error signal means.

13. The elevator system of claim 1 wherein the speed pattern signal has different polarities for the up and down travel directions of the elevator car, and wherein the control means includes absolute value means which provides a single polarity signal responsive to the absolute value of each polarity of the speed pattern signal, and including slope limiting means for limiting the rate of change of the speed pattern signal prior to the processing of the speed pattern signal by the control means, preventing the speed pattern signal from rapidly changing from its maximum value at one polarity to its maximum value at the other polarity, enabling the absolute value means to detect such a change.

14. An elevator system, comprising:
an elevator car,
motive means for said elevator car,
speed pattern means providing a speed pattern signal indicative of the desired speed of said elevator car,
means providing a velocity signal responsive to the actual speed of said elevator car,
controllable impedance means,
absolute value means providing a single polarity absolute value signal responsive to the absolute value of said speed pattern signal,
control means providing a first control signal responsive to the magnitude of the absolute value signal, and a second control signal responsive to the rate of change of the absolute value signal,
reference means providing first and second reference signals responsive to desired maximum values for the magnitude of the absolute value signal, and the rate of change of the absolute value signal, respectively,
first comparator means providing a first modification signal which modifies the impedance of said controllable impedance means when the first control signal exceeds the first reference signal,
second comparator means providing a second modification signal which modifies the impedance of said controllable impedance means when the second control signal exceeds the second reference signal,
and error signal means providing an error signal for controlling said motive means in response to said velocity signal and said speed pattern signal,
said controllable impedance means being connected to modify the effect of said speed pattern signal on said error signal means, at least when its impedance is modified by at least one of the first and second comparator means.

15. The elevator system of claim 14 including slope limiting means, said slope limiting means limiting the rate of change of the speed pattern signal, with the control means being responsive to the speed pattern signal after the speed pattern signal has been monitored and limited by said slope limiting means.

16. The elevator system of claim 14 wherein the control means includes means for additionally making the first control signal responsive to a factor related to the rate of change of the absolute value signal, to cause the elevator car to approach the maximum speed dictated by the speed pattern signal without overshoot thereof.

17. An elevator system, comprising:
an elevator car,
motive means for said elevator car,
speed pattern means providing a speed pattern signal indicative of the desired speed of said elevator car,
means providing a velocity signal responsive to the actual speed of said elevator car,
controllable impedance means,
control means providing a first control signal responsive to at least one predetermined parameter of said velocity signal, said control means including reference means providing a first reference signal relative to said at least one predetermined parameter, said control means modifying the impedance of said controllable impedance means in response to a predetermined relationship between said first control signal and said first reference signal,
and error signal means providing an error signal for controlling said motive means in response to said velocity signal and said speed pattern signal,
said controllable impedance means being connected to modify the affect of the speed pattern signal on said error signal means, at least when its impedance is modified by said control means.

* * * * *